Oct. 30, 1956 — R. H. SULLIVAN ET AL — 2,768,495
ELECTRIC BALANCE CLOCK
Original Filed July 11, 1945 — 3 Sheets-Sheet 1

Inventors
Peter R. Contant &
Raymond H. Sullivan

M. H. Strickland
Attorney

Oct. 30, 1956  R. H. SULLIVAN ET AL  2,768,495
ELECTRIC BALANCE CLOCK

Original Filed July 11, 1945  3 Sheets-Sheet 2

Inventors
Peter R. Contant &
Raymond H. Sullivan

By  Y. H. Strickland
Attorney

Oct. 30, 1956  R. H. SULLIVAN ET AL  2,768,495
ELECTRIC BALANCE CLOCK
Original Filed July 11, 1945  3 Sheets-Sheet 3

Inventors
Peter R. Contant &
Raymond H. Sullivan
G. H. Strickland
Attorney 2,768,495
Patented Oct. 30, 1956

2,768,495

ELECTRIC BALANCE CLOCK

Raymond H. Sullivan and Peter R. Contant, Rochester, N. Y., assignors to General Motors Corporation, Detroit, Mich., a corporation of Delaware Original application July 11, 1945, Serial No. 604,386, now Patent No. 2,631,423, dated March 17, 1953. Divided and this application January 23, 1953, Serial No. 336,365

3 Claims. (Cl. 58—28)

The present invention relates generally to electric clocks and more particularly to certain improvements in a clock of the electromagnetic impulse type adapted especially for use in automobiles, and is a division of Serial No. 604,386, filed July 11, 1945, now Patent No. 2,631,423.

The principal object of the invention is to provide a clock of this type of relatively simple constructional design, small overall dimensions and low manufacturing cost which will give long and reliable service under such variable voltage, temperature and vibration conditions as are encountered in automobile use.

One feature of the present construction involves the use of a single electromagnet with poles associated with a timing mechanism including a balance wheel armature which controls and is sustained in oscillation by intermittent energization of the electromagnet, and with further poles associated with a separate driving mechanism including an armature to drive the clock gear train.

A further feature comprises the provision of means to compensate for variations in voltage and regulate the strength of the magnetic field in the balance wheel circuit and a means to prevent destructive sparking at the contact points of the timing mechanism.

Many other features of the present invention including provisions for starting and the construction and relative arrangement of the several parts of the clock will be apparent from or specifically noted in the description of the embodiment shown in the accompanying drawings.

Figure 1:
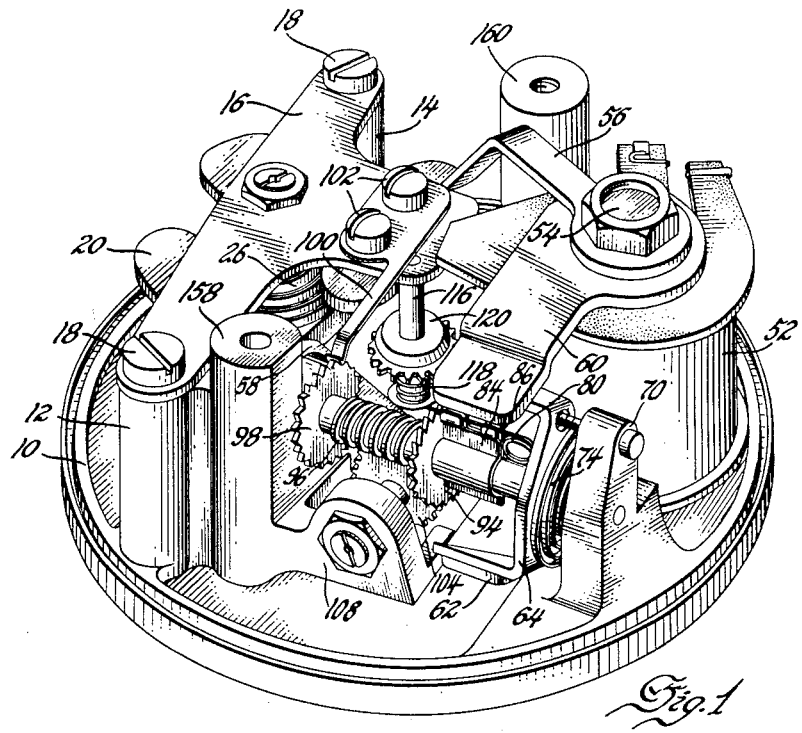
Fig. 1 is a perspective view of the clock mechanism.
Figure 2:
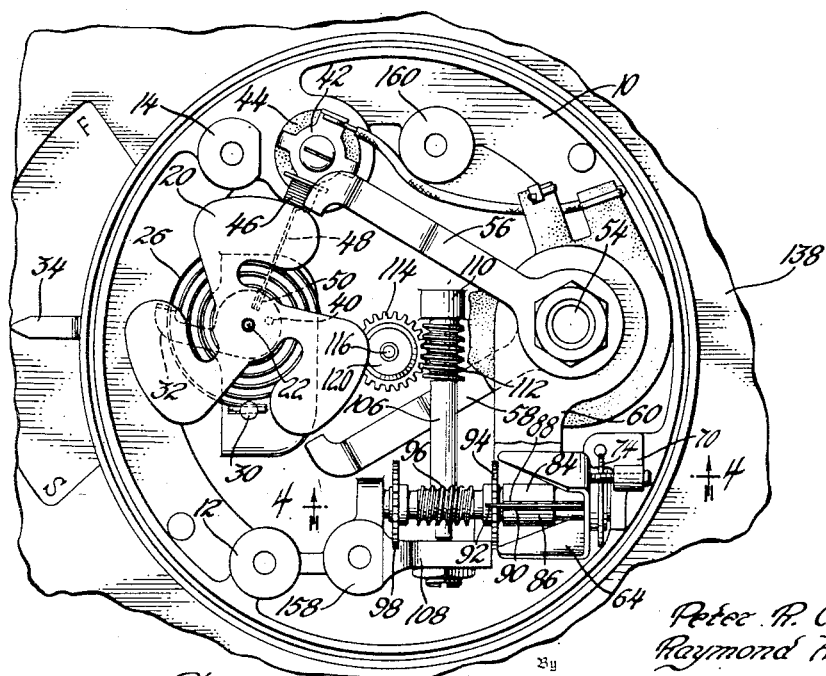
Fig. 2 is a bottom plan view of the clock with the back cover and other parts removed or broken away.
Figure 3:
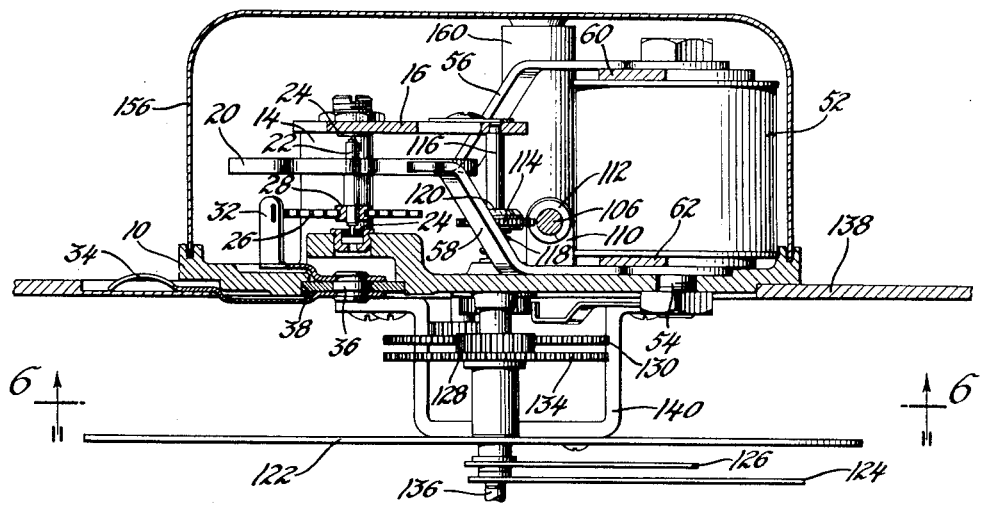
Fig. 3 is a transverse section with parts in elevation.

Referring first to Figs. 1 to 3, a base plate 10 is provided with spaced pillars 12 and 14 on which a bridge 16 is secured by screws 18. A three-pole armature 20 which also functions as the balance wheel is mounted on a staff 22 journaled in jeweled bearings 24 in the bridge 16 and an offset portion of base plate 10. A hairspring 26 is secured at its inner end to collet 28 on the staff 22 and is secured at its outer end to a post 30 on the base plate with the outer turn of the hairspring passing through a slot in a regulator arm 32. This arm is connected as shown in Fig. 3 to an operating indicator pointer 34 by a pivot post 36 extending through and rotatable in a bearing plate 38 on base plate 10 below the staff 22 to provide for the adjustment of the arm 32 to shorten or lengthen the effective length of the hairspring to regulate the period of oscillation of the balance wheel in the usual manner.

An electrical contact 40 which may consist of a small pin or rod extending parallel to the staff 22 is secured to the armature 20 at a point radially spaced from the staff and this contact is grounded to the base plate 10 through the armature, staff and hairspring. A bracket 42 which is secured to the base plate and electrically insulated therefrom by an insulating bushing 44 serves as a support for a helical spring 46 which is formed with a straight portion 48 extending towards the staff 22. An electrical contact blade 50 is secured to the end of the spring portion 48 and is so located as to project into the arcuate path of movement of the contact 40 on oscillation of the armature 20. The coils of the helical spring 46 are tightly wound together to effect a rapid damping of the vibrations of the contact blade 50 when the blade is released after the deflection thereof by the contact 40 as it engages and moves past the blade during oscillation of the armature 20.

During normal operation the contact 40 alternately engages the opposite faces of the contact blade 50 to provide for the intermittent energization of the winding of an electromagnet, indicated generally at 52, which is adapted to impart periodic impulses to the armature 20 to maintain the oscillation thereof. The electromagnet includes a core 54 having one end secured to the base plate 10 and upper and lower pole pieces 56 and 58, respectively, which are so formed as to locate the pole tips in the plane of the armature 20 at points relatively close to the periphery thereof.

The balance wheel armature assembly and the electromagnet with its pole pieces 56 and 58 and the contact arrangement above described constitute a timing mechanism in which the balance wheel armature operates without restraint other than that imposed by the hairspring, the pivot friction, and the mechanical load imposed by the operation of the contacts. Since this mechanical load and the pivot friction is quite low and not subject to any appreciable variations, it will be seen that the balance wheel armature oscillates at a frequency determined principally by its mass and the torque of the hairspring.

Referring now to the driving mechanism for the clock gear train, the electromagnet 52 is provided with additional upper and lower pole pieces 60 and 62, respectively, which extend parallel to one another and terminate in vertically spaced ends adapted to impart periodic impulses to an armature 64 which is pivotally mounted for limited oscillation between the ends of the pole pieces. The armature 64 which is generally of channel form with the flanges thereof adjacent the pole pieces is secured to a sleeve 66 journaled on a stationary shaft 68 supported by brackets 70 and 72 on the base plate 10.

A spiral spring 74 having its inner end secured to the sleeve 66 and its outer end secured to the bracket 70 is adapted to urge the armature 64 out from between the pole pieces 60 and 62 and the extent of movement of the armature is limited by the provision of an arcuate slot 76 in the armature and a closely wound helical spring 78 having one end secured to the bracket 70 with the other end located within the slot 76. This spring 78 also acts as a buffer to cushion the motion of the armature at both ends of its movement as it is oscillated about the pivot shaft 68 being moved in one direction by the spring 74 and in the other direction by magnetic action when the electromagnet is energized by the timing mechanism.

Figure 4:
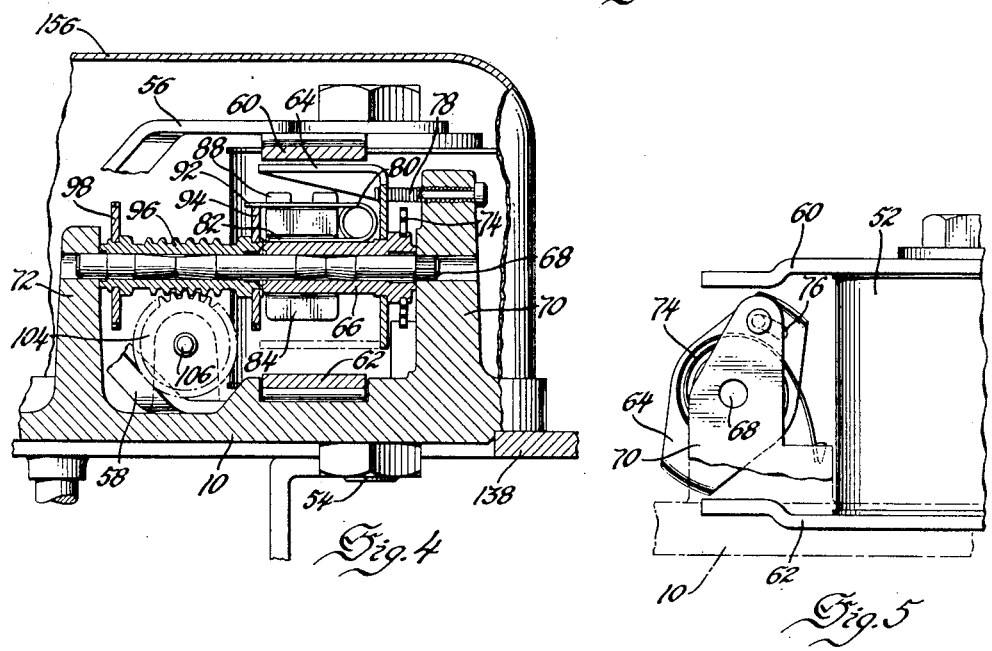
Fig. 4 is an enlarged fragmentary section of the driving mechanism taken substantially on line 4—4 of Fig. 2.
Figure 5:
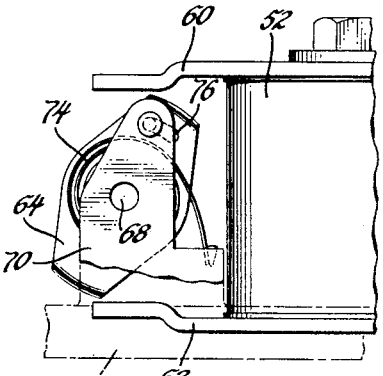
Fig. 5 is a fragmentary elevation of part of the driving mechanism of Fig. 4.

A driving pawl in the form of a hairpin spring or spring wire of U-shape indicated generally at 80 is secured to the sleeve 66. As shown in Fig. 4, this spring is formed with substantially parallel arms of unequal length connected by several turns or coils to provide the desired spring action. The spring 80 is arranged with these arms extending substantially parallel to the axis of the shaft 68 with the shorter arm 82 tightly secured to the sleeve 66 between similarly formed sheet metal plates 84 and 86 which are clamped around the sleeve and welded or riveted together. The abutting flat portions of the plates 84 and 86 at one side of the sleeve 66 are provided with similarly formed spaced extensions 88 and 90, respectively, which are offset outwardly from the planes of the flat portions to form longitudinally aligned grooves between these extensions to receive the longer arm 92 of the spring 80.

The free end of the arm 92 projects beyond the extensions 88 and 90 to engage a ratchet wheel 94 and arm 92 acts as a spring pawl to advance the ratchet wheel one tooth each time the electromagnet is energized and the armature 64 moved in one direction. The end of arm 92 is held by the spring action of the coils of the hairpin spring in engagement with the ratchet wheel and the grooves between plates 84 and 86 which receive arm 92 function as guides for the radial movement of the arm with reference to the axis of the shaft 68 as the end of the arm is radially displaced by the teeth of the ratchet wheel.

The ratchet wheel 94 is secured to a driving worm 96 journaled on the stationary shaft 68 and the driving worm carries an index or star wheel 98. A detent spring 100 which is secured at one end to the bridge 16 as by screws 102 has its free end of substantially V-shape to engage the teeth of the star wheel to prevent reverse rotation or any movement of the ratchet wheel and driving worm at times other than when these parts are being moved in one direction by the spring pawl.

The driving worm 96 engages a gear 104 secured on a shaft 106 mounted in brackets 108 and 110 on the base plate 10, and a worm 112 on shaft 106 meshes with a gear 114 which is rotatable on a central shaft 116 and forced by a spring 118 into frictional driving engagement with a collar 120 fixed to the shaft. The shaft 116 is journaled at one end in the bridge 16 and extends through the base plate 10 and a dial plate 122 with the usual minute hand 124 mounted on the end of this shaft and the hour hand 126 driven thereby through a reduction gear train consisting of the gears 128, 130, 132 and 134.

A setting mechanism for manually setting the position of the hands includes a setting stem 136 which is journaled for rotation and limited endwise movement in a mounting plate or other support 138 and a bracket 140 secured to the plate 138 with the stem extending through the dial plate 122 and provided with a knurled knob 142. A gear 144 and a metal disk 146 of slightly larger diameter than the gear are secured on the stem 136 which is normally held against endwise movement with the disk 146 in engagement with plate 138 by means of a spring 148. An idler gear 150 is mounted on the plate 138 in mesh with the gear 130 of the reduction gear train and this gear 150 is adapted to be engaged by the gear 144 on the setting stem when the stem is moved endwise to then provide for the adjustment of the hands by rotation of the stem in the usual manner.

Figure 6:
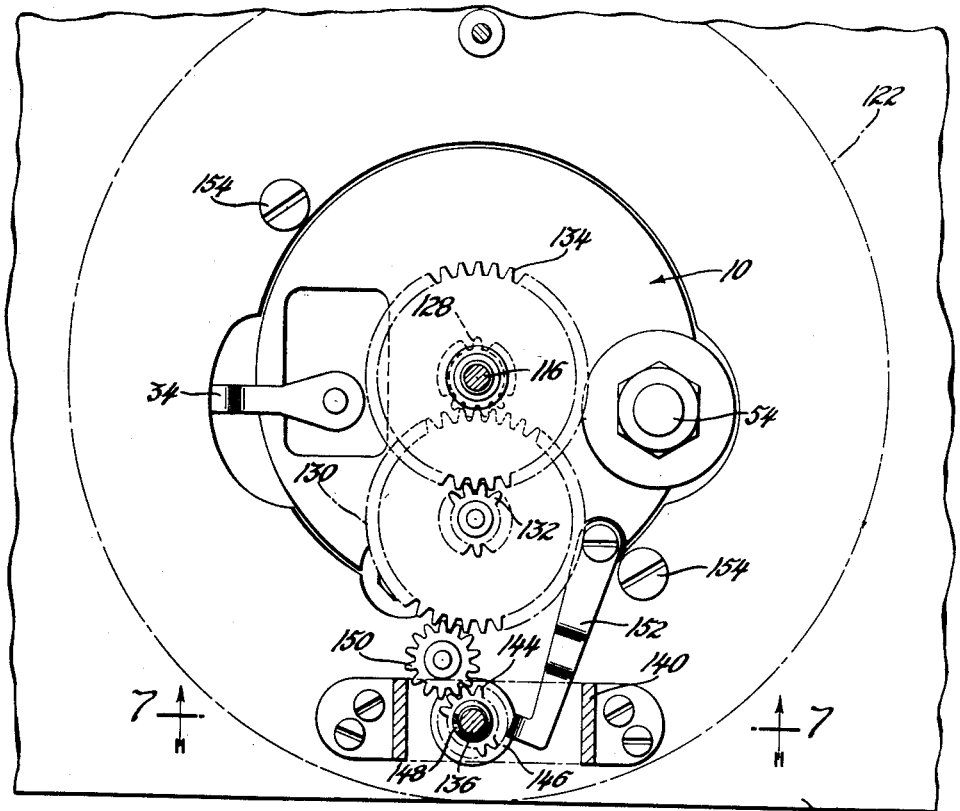
Fig. 6 is a fragmentary front view taken substantially on line 6—6 of Fig. 3.
Figure 7:
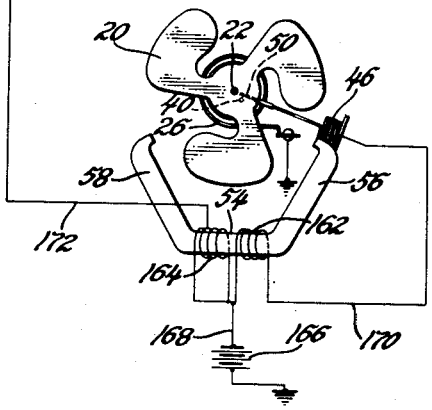
Fig. 7 is a fragmentary section taken substantially on line 7—7 of Fig. 6.
Figure 7:
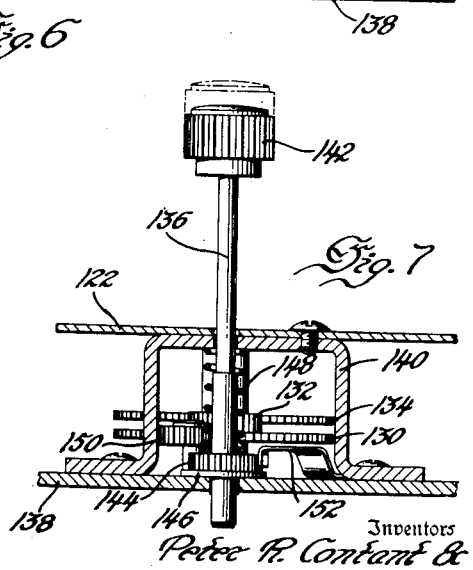

As shown in Figs. 6 and 7, a spring contact arm 152 is secured to and insulated from the base plate 10 and formed with a flanged end which extends over the edge of the disk 146 on the setting stem 136 and is normally spaced therefrom but will be engaged thereby when the stem 136 is moved endwise during the setting operation to complete a starting circuit to be hereinafter described.

The base plate 10 may be secured by screws 154 to the mounting plate or other support 138 and a sheet metal cover 156 secured as by screws on posts 158 and 160 on the base plate 10 to conceal and protect the timing and driving mechanisms.

Figure 8:
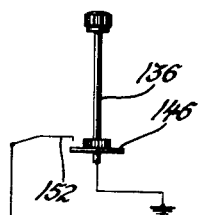
Fig. 8 is a diagrammatic view showing the electrical starting and running circuits.

Referring now to the diagrammatic showing in Fig. 8, the electromagnet is provided with two windings as indicated at 162 and 164. Although shown as separated these windings are wound in bifilar relationship, or in other words, the two wires constituting these windings are parallel and wound simultaneously on the core 54 with the same number of turns. The source of current, indicated as a battery 166, is connected directly to one end of each of the windings 162 and 164 by conductor 168.

The winding 162 which may be termed the running winding is connected at its other end by conductor 170 to the contact blade 50 through the spring 46 and the running circuit will therefore be completed whenever the contact 40 on balance wheel armature 20 is in engagement with the contact blade 50 through the balance staff 22 and hairspring 26 to ground.

The ends of the winding 164 are connected together, thus short-circuiting this winding on itself to function as a magnetic damping means, and the winding 164 is tapped at an intermediate point which is electrically off center with this tap connected by conductor 172 to the contact arm 152 to thereby function as a starting winding when a circuit is completed through the disk 146 and setting stem 136 to ground.

In Fig. 8 the relative locations of the several parts have been diagrammatically shown when the circuits are open and the balance wheel armature 20 is in the position of rest or equilibrium to which it is urged by the hairspring 26. In this position it will be seen that the contact 40 is slightly spaced from the contact blade 50 and the contact arm 152 is also spaced from the disk 146. When the setting stem 136 is moved endwise during the setting operation the disk 146 will engage arm 152 to complete a starting circuit which will be effective, since the connection of conductor 172 to the winding 164 is electrically off center, to create a magnetic field through the pole pieces 56 and 58 to attract the balance armature 20 and rotate the armature in a clockwise direction, until the arms of the armature which were closest to the pole pieces are drawn to substantially the position shown in Fig. 2.

The armature will then be magnetically held in this position during rotation of the setting stem to set the hands but as soon as the stem is released and returned endwise by the spring 148, the starting circuit will be broken at contact arm 152 and the armature will then be rotated in a counter-clockwise direction with sufficient inertia to engage contact 40 thereon with the contact blade 50 and move on past this blade.

It will be understood that whenever contact 40 engages the contact blade 50 a circuit will be completed through the running winding 162 and the balance wheel armature will be sustained in oscillation, after starting, by magnetic impulses imparted thereto upon energization of this winding during movement of the armature in both directions. Whenever the winding 162 is energized, a current will also be set up or induced in the short-circuited winding 164 which will thereby function as a magnetic damping means to practically eliminate all sparking at the contact 40 and contact blade 50.

In an electric clock of the magnetic impulse type for use in automobiles it is desirable to provide some means to compensate for the wide variations in battery voltage such as affect the rate of the clock by changing the magnetic field strength which varies the amplitude of the balance. The effect of varying voltages would be even more pronounced in the present clock wherein, as distinguished from prior clocks of this type, there is no mechanical connection between the timing mechanism and the driving mechanism so that there is no restraint such as caused by the drive and gear train friction on the amplitude of the balance wheel armature.

The provision in the present clock of separate pole pieces for the independent armatures of the timing mechanism and the driving mechanism is employed in the manner to be now described to maintain the magnetic flux utilized to operate the balance wheel armature at a practically constant value throughout the range of voltage variations that are encountered in automobile operation.

With reference first to the magnetic circuit of the timing mechanism, the electromagnet core 54, the pole pieces 56 and 58, and the balance wheel armature 20 are made from a material such as a nickel iron alloy containing over 44% nickel, and preferably a 50% nickel iron alloy, which will become magnetically saturated at very low magnetic densities or under a very low magnetizing force.

The amount of flux, except for leakage, which is capable of passing through this magnetic circuit is determined and limited in the present arrangement by the minimum cross-sectional area of the pole pieces 56 and 58 which are formed with their smallest cross section at the pole tips, and the magnetic circuit is so designed that the application of a relatively low voltage to the running winding 162 of the electromagnet will produce a magnetizing force sufficient to substantially saturate the pole pieces 56 and 58. The cross section of the narrowest portion of the armature 20 is larger than that of the pole pieces or pole tips so that the armature itself will not be substantially saturated but the flux which operates the armature will be kept practically constant at varying voltages by reason of the saturation of the pole pieces.

At higher voltages than the minimum necessary to saturate the pole pieces or the reduced tips thereof, there would ordinarily be magnetic leakage through the air gaps in the magnetic circuit and some of this leakage flux would tend to increase the total flux acting on the unsaturated armature and increase its amplitude.

To absorb this leakage flux in addition to any flux in excess of that necessary to saturate the pole pieces 56 and 58, the magnetic circuit through the pole pieces 60 and 62 for the driving armature 64 has been designed to function as a shunt path. For this purpose, the pole pieces 60 and 62 are made from a material such as Armco iron or Swedish iron or other known magnetic materials which do not become magnetically saturated or substantially so at the maximum voltage or magnetic strength encountered in the present application.

Although the principal features of the present clock construction will be apparent from the foregoing description it is desired to call attention to certain distinguishing features thereof which have been combined to produce an automobile clock of exceptional performance from the standpoint of both accuracy and reliability.

By separating the clock mechanism into mechanically independent timing and driving mechanism, the gear train friction and any variations therein will have no effect on the balance wheel timing which controls the periodic energization of the electromagnet. The balance wheel timing will also not be affected by variations in voltage since the pole pieces for the balance wheel armature will be substantially saturated at the minimum voltage and the pole pieces for the separate driving armature constitute an unsaturated shunt circuit to absorb the excess flux generated at higher voltages.

Destructive sparking at the contact points is effectively prevented by the provision of the short-circuited damping winding on the electromagnet and this winding is further employed in a starting circuit which includes a starting switch operated by the setting stem for manually setting the position of the hands.

Many other features including the details of construction and the mounting of the several parts as disclosed herein are considered to also constitute distinct improvements over prior practice. It will be understood that many modifications and the separate use of certain features are contemplated as coming within the scope of the present invention as defined in the claims appended hereto.

We claim:

1. In an electric clock of the magnetic impulse type, an electromagnet having a running winding and a pair of pole pieces, a balance wheel armature mounted for oscillation between said pole pieces, a circuit to periodically energize said running winding including coacting contact members controlled by the motion of said armature, and a starting circuit including a combined damping and starting winding on said electromagnet which is short-circuited on itself to prevent sparking at said contact members and a manually operable starting switch connected to said starting winding to provide for the magnetization of said electromagnet when said coacting contact members are not in engagement.

2. The combination set forth in claim 1 in which said clock is provided with a manually operable setting stem and the said starting switch is operable by movement of said stem during the setting operation.

3. In an electric clock of the magnetic impulse type, an electromagnet having a running winding and a pair of pole pieces, a balance wheel armature mounted for oscillation between said pole pieces, a circuit to periodically energize said running winding including a source of current having a pair of terminals, one of said terminals being connected to ground, the other of said terminals being connected to one end of said winding and coacting contact members controlled by the motion of said armature to connect the other end of said winding to ground, means to prevent sparking at said contact members including a short-circuited winding on said electromagnet having one end connected to said other terminal of the source of current with said windings on the electromagnet wound in bifilar relationship, an off-center tap on said short-circuited winding, and a starting circuit including a manually operable starting switch adapted to connect the off-center tap on said short-circuited winding to ground.

References Cited in the file of this patent

UNITED STATES PATENTS

| | | |
|---|---|---|
| 293,432 | Edison | Feb. 12, 1884 |
| 812,773 | Schwarze | Feb. 13, 1906 |
| 851,467 | Wood | Apr. 23, 1907 |
| 1,978,311 | Julian | Oct. 23, 1934 |
| 2,108,010 | Delviniotti | Feb. 8, 1938 |
| 2,289,673 | Neumeister et al. | July 14, 1942 |

FOREIGN PATENTS

| | | |
|---|---|---|
| 39,481 | France | Aug. 11, 1931 |
| | (3rd addition to No. 666,179) | |
| 45,419 | France | May 20, 1935 |
| | (5th addition to No. 666,179) | |
| 855,412 | France | Feb. 12, 1940 |